US012639110B2

(12) United States Patent
Zhang et al.

(10) Patent No.: US 12,639,110 B2
(45) Date of Patent: May 26, 2026

(54) TASK SCHEDULING METHOD BASED ON IMPROVED CHIMPANZEE OPTIMIZATION ALGORITHM

(71) Applicant: NANJING UNIVERSITY OF POSTS AND TELECOMMUNICATIONS, Nanjing (CN)

(72) Inventors: Dengyin Zhang, Nanjing (CN); Zhou Yu, Nanjing (CN)

( * ) Notice: Subject to any disclaimer, the term of this patent is extended or adjusted under 35 U.S.C. 154(b) by 416 days.

(21) Appl. No.: 18/497,791

(22) Filed: Oct. 30, 2023

(65) Prior Publication Data

US 2024/0411589 A1    Dec. 12, 2024

Related U.S. Application Data

(63) Continuation of application No. PCT/CN2023/122648, filed on Sep. 28, 2023.

(30) Foreign Application Priority Data

Jun. 7, 2023    (CN) .......................... 202310665576.9

(51) Int. Cl.
*G06F 9/48* (2006.01)
(52) U.S. Cl.
CPC .................................. *G06F 9/4881* (2013.01)
(58) Field of Classification Search
CPC .................................................... G06F 9/4881
See application file for complete search history.

(56) References Cited

U.S. PATENT DOCUMENTS

| | | | |
|---|---|---|---|
| 10,168,953 B1 * | 1/2019 | Gupta ..................... | G06F 3/067 |
| 2020/0019435 A1 * | 1/2020 | Stevenson .............. | G06N 3/006 |

(Continued)

FOREIGN PATENT DOCUMENTS

| | | |
|---|---|---|
| CN | 109800071 A | 5/2019 |
| CN | 114648232 A | 6/2022 |
| CN | 116579370 A | 8/2023 |

OTHER PUBLICATIONS

Heming et al., An enhanced chimp optimization algorithm for continuous optimization domains, Apr. 7, 2021, Complex & Intelligent Systems (Year: 2021).*

(Continued)

*Primary Examiner* — Larry T Mackall

(57) ABSTRACT

The present application discloses a task scheduling method based on an improved chimpanzee optimization algorithm, including obtaining a task to be scheduled and a task scheduling model pre-established by using a chimpanzee optimization algorithm, performing iterative computation of chimpanzees in the task scheduling model by the chimpanzee optimization algorithm; and ending the iterative computation in response to that an iteration termination condition is reached, outputting an optimal solution, and obtaining an optimal scheduling scheme. The present application solves the problem of the traditional chimpanzee optimization algorithm in the prior art that is prone to falling into the local optimum, and the imbalance between the global exploration capacity and the local exploitation capacity, the improved chimpanzee optimization algorithm has different aspects of performance enhancement compared to general intelligence algorithms of population.

9 Claims, 3 Drawing Sheets obtaining a task to be scheduled and a task scheduling model pre-established by using a chimpanzee optimization algorithm, and initializing a population and a parameter by using a two-dimensional function Halton sequence performing iterative computation of chimpanzees in the task scheduling model by the chimpanzee optimization algorithm ending the iterative computation in response to that an iteration termination condition is reached, outputting an optimal solution, and obtaining an optimal scheduling scheme

(56)                    References Cited

U.S. PATENT DOCUMENTS

| 2023/0168925 | A1* | 6/2023 | Makaya | ................ G06F 11/302 |
| | | | | 718/102 |
| 2024/0127144 | A1* | 4/2024 | St. Pierre | ....... G06Q 10/063112 |
| 2024/0355469 | A1* | 10/2024 | Banoth | .................. G16H 50/30 |

OTHER PUBLICATIONS

Mandeep et al., SChoA: a newly fusion of sine and cosine with chimp optimization algorithm for HLS of datapaths in digital filters and engineering applications, Jan. 7, 2021, Engineering with Computers (2022) (Year: 2021).*

* cited by examiner obtaining a task to be scheduled and a task scheduling model pre-established by using a chimpanzee optimization algorithm, and initializing a population and a parameter by using a two-dimensional function Halton sequence performing iterative computation of chimpanzees in the task scheduling model by the chimpanzee optimization algorithm ending the iterative computation in response to that an iteration termination condition is reached, outputting an optimal solution, and obtaining an optimal scheduling scheme

FIG.1

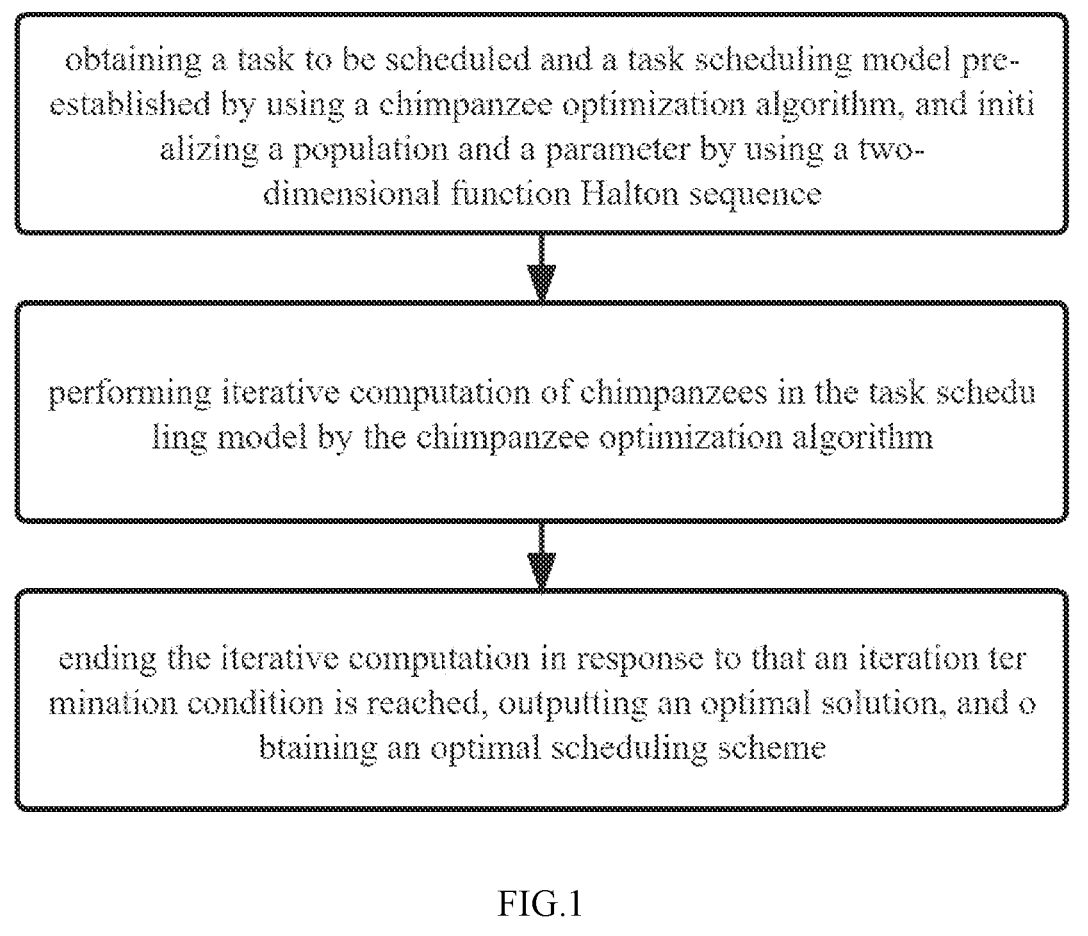

TASK SCHEDULING METHOD BASED ON IMPROVED CHIMPANZEE OPTIMIZATION ALGORITHM

CROSS-REFERENCE TO RELATED APPLICATIONS

This application claims priority to Chinese Patent Application No. 202310665576.9, filed on Jun. 7, 2023, the entire disclosures of which are incorporated herein by reference.

TECHNICAL FIELD

The present application relates to the technical field of task scheduling, and in particular relates to a task scheduling method based on an improved chimpanzee optimization algorithm.

BACKGROUND

Cloud computing is a technology that provides virtual resources with customizable management according to users' needs, which is capable of processing massive tasks in parallel and facilitates the solution of large-scale data computation. With the rapid development of information technology and internet industry, the cloud computing is widely used in various industries and fields such as economy, culture, military, and commerce.

The task scheduling strategy in cloud environment is closely related to the performance and efficiency of cloud computing system, and how to schedule cloud tasks in a way that both meets the demand and ensures load balancing is a hot issue in cloud computing, and the efficient cloud computing task scheduling algorithms can accelerate task scheduling and reduce unnecessary resource consumption while ensuring load balancing of the cloud computing system, so whether it is to reduce the cost or to improve the performance of cloud computing, the study of cloud computing task scheduling algorithms is of positive significance.

How to optimally complete task scheduling in cloud environment is a NP-complete problem, for this kind of task scheduling problem, domestic and foreign researchers have carried out a lot of research on heuristic algorithms based on group intelligence, for example, a Particle Swarm Optimization Algorithm (PSO), a Cuckoo Search Algorithm (GWO), a Gray Wolf Optimization Algorithm and so on. All of these algorithms have improved the performance of cloud computing platform to a certain extent, but they do not fully consider the problem of the premature convergence of the algorithms and the ease of falling into local optimization. In recent years, with the continuous development of the field of intelligent algorithms, more algorithms have been continuously applied to various problems by virtue of their respective advantages, the Chimp Optimization Algorithm (ChOA) is a new type of intelligent optimization algorithm based on the social behavior of chimpanzee populations. Compared with the existing algorithms, the ChOA has fewer control parameters, simple implementation, and higher stability, which is attracted by scholars at home and abroad. However, in the traditional chimpanzee optimization algorithm, the individuals of the population obtain food satisfaction in the final stage of hunting, and the subsequent individual sexual motivation will make the chimpanzees release their nature, which makes it easy to fall into the local optimum in the late stage of algorithm optimization, leading to premature maturity or even iteration stagnation, and traditional chimpanzee optimization algorithms suffer from the disadvantage of imbalance between global exploration capability and local exploitation capability.

SUMMARY

A purpose of the present application is to overcome the deficiencies in the prior art, to provide a task scheduling method based on an improved chimpanzee optimization algorithm, to solve a problem of the traditional chimpanzee optimization algorithm in the prior art that is prone to falling into the local optimum, and the imbalance between the global exploration capacity and the local exploitation capacity. A two-dimensional function Halton sequence is introduced on the basis of the random initialization of the chimpanzee algorithm to generate pseudo-random numbers to initialize the population, so that the individuals of the population are more evenly distributed throughout the solution space, the population diversity at the time of the initialization of the algorithm is improved, and the individuals can quickly discover the position of the high-quality solution, thereby accelerating the convergence of the algorithm.

In order to achieve the above purpose, the present application adopts the following technical solutions.

In a first aspect, the present application provides a task scheduling method based on an improved chimpanzee optimization algorithm, including:

obtaining a task to be scheduled and a task scheduling model pre-established by using a chimpanzee optimization algorithm, and initializing a population and a parameter by using a two-dimensional function Halton sequence;

performing iterative computation of chimpanzees in the task scheduling model by the chimpanzee optimization algorithm; and ending the iterative computation in response to that an iteration termination condition is reached, outputting an optimal solution, and obtaining an optimal scheduling scheme.

Combined with the first aspect, the performing iterative computation of chimpanzees in the task scheduling model by the chimpanzee optimization algorithm includes:

obtaining an initial population position and an initial adaptation of each chimpanzee in the population, sorting the population according to a value of the adaptation and dividing a role of the population, and obtaining an initial population role position;

updating the population position and the population role position according to a sine-cosine optimization strategy to obtain an updated adaptation of each chimpanzee in the population; and where the task scheduling model pre-established by using the chimpanzee optimization algorithm includes:

taking a plurality of virtual machines in a cloud computing as a plurality of chimpanzees in the population, taking task assignment to the virtual machines as a process of the plurality of chimpanzees driving and chasing preys, and the process of the plurality of chimpanzees driving and chasing the preys being a process of finding the optimal solution.

Combined with the first aspect, the two-dimensional function Halton sequence includes:

$$n = \sum_{i=0}^{m} b_i \cdot p^i = b_m \cdot p^m + \cdots + b_1 \cdot p^1 + b_0;$$

<table>
<tr><td>3</td><td>4</td></tr>
</table>

-continued $$\theta(n) = b_0 \cdot p^{-1} + b_1 \cdot p^{-2} + \cdots + b_m \cdot p^{-m-1};$$

$$H(n) = [\theta_1(n), \theta_2(n)];$$

where n is any integer within [1, N], N is a number of individuals in the population, p is a prime number not less than 2, $b_i \in \{0, 1, 2 \ldots p-1\}$ is a constant, $\theta(n)$ is a defined sequence function, H(n) is a final obtained two-dimensional Halton sequence, m is a number of nodes, n is a total number of tasks, i is greater than and equal to 1 and less than and equal to N, and i is a number of cycles;

where a position of a Nth chimpanzee is $X_{ij}$, $i \in \{1, 2, \ldots, m\}$, $j \in \{1, 2, \ldots, n\}$.

Combined with the first aspect, the sorting the population according to the value of the adaptation and dividing the role of the population, and obtaining the initial population role position includes:

sorting the population according to the value of the adaptation from high to low and dividing the role of the population, wherein the role of the population comprises an attacker, a barrier, a chaser and a driver; the attacker is a current optimal solution, and the other three are descending in order;

obtaining a mathematical model of the process of the plurality of chimpanzees driving and chasing the preys according to the role of the population, the mathematical model being:

$$d(t) = |c \cdot X_{prey}(t) - h \cdot X_{chimp}(t)|;$$

$$X_{chimp}(t+1) = X_{prey}(t) - a \cdot d;$$

where t is a current number of iterations, d is a distance of each chimpanzee from the prey, a and c are coefficient vectors, h is a chaotic mapping vector, h represents an effect of sexual motivation of the chimpanzee population during a hunting process, $X_{prey}$ is a vector of a position of the prey, $X_{chimp}$ is a vector of a position where the chimpanzee is currently located, d(t) is a vector of a distance of each chimpanzee from the prey under the current number of iterations, and $X_{chimp}$ (t+1) is a vector of a position where the chimpanzee is located under a next number of iterations.

Combined with the first aspect, the obtaining the initial population role position includes:

selecting four candidate solutions with a highest degree of adaptation according to the role of the population and the mathematical model of the process of the chimpanzee driving and chasing the preys, and obtaining the vector of positions of the other chimpanzees and a vector of the initial population role position by a position vector computation formula, the position vector computation formula including:

$$d_{Attacker} = |c_1 \cdot X_{Attacker} - h_1 \cdot X|;$$

$$d_{Barrier} = |c_2 \cdot X_{Barrier} - h_2 \cdot X|;$$

$$d_{Chaser} = |c_3 \cdot X_{Chaser} - h_3 \cdot X|;$$

$$d_{Driver} = |c_4 \cdot X_{Driver} - h_4 \cdot X|;$$

-continued $$X_1 = X_{Attacker} - a_1 \cdot d_{Attacker};$$

$$X_2 = X_{Barrier} - a_2 \cdot d_{Barrier};$$

$$X_3 = X_{Chaser} - a_3 \cdot d_{Chaser};$$

$$X_4 = X_{Driver} - a_4 \cdot d_{Driver};$$

$$X(t+1) = \frac{X_1 + X_2 + X_3 + X_4}{4};$$

where $d_{Attacker}$ is a distance between the attacker chimpanzee and the prey, $d_{Barrier}$ is a distance between the barrier chimpanzee and the prey, $d_{Chaser}$ is a distance between the chaser chimpanzee and the prey, $d_{Driver}$ is a distance between the driver chimpanzee and the prey, $X_{Attacker}$ is a vector of position of the attacker chimpanzee, $X_{Barrier}$ is a vector of position of the barrier chimpanzee, $X_{Chaser}$ is a vector of position of the chaser chimpanzee, $X_{Driver}$ is a vector of position of the driver chimpanzee; $c_1c_2c_3c_4$, $a_1a_2a_3a_4$ are all coefficient vectors, $h_1h_2h_3h_4$ represent the effect of sexual motivation of the chimpanzee population during the hunting process, $X_1$, $X_2$, $X_3$, $X_4$ are the vectors of the positions during calculation, X(t+1) is a vector of position at next moment, and X is a vector of position at current moment.

Combined with the first aspect, the updating the population position and the population role position according to the sine-cosine optimization strategy includes:

correcting a position update strategy of an original chimpanzee optimization algorithm according to the sine-cosine optimization strategy, calculating a position where the optimal solution locates while balancing the algorithm, and the corrected position update strategy is:

$$X(t+1) = \begin{cases} X(t) + r_3 \times \sin(2\pi r_4) \times D^{\theta}, r_5 < 0.5 \\ X(t) + r_3 \times \cos(2\pi r_4) \times D^{\theta}, r_5 \geq 0.5 \end{cases};$$

$$D^{\theta} = |r_6 X_i^{\alpha}(t) - |X_i(t)||;$$

$$r_3 = 2 - 2 \times \frac{t}{T};$$

where $r_3$ is a number that is adaptively reduced with the number of iterations, $r_4$, $r_5$ and $r_6$ are random numbers within [0,1], and X(t) is an updated vector of position of the chimpanzee, $D^{\theta}$ is a sine-cosine optimization strategy formula.

Combined with the first aspect, the ending the iterative computation in response to that the iteration termination condition is reached, outputting the optimal solution, and obtaining the optimal scheduling scheme, further including:

in response to that t is less than T, the iteration termination condition is reached, ending the iterative computation, outputting the optimal solution, and obtaining the optimal scheduling scheme;

in response to that t is greater than and equal to T, the iteration termination condition is not reached, then reusing the two-dimensional function Halton sequence to initialize the population and the parameter, and continuing to executing subsequent steps until the iterative computation is ended in response to that the iteration termination condition is reached.

In a second aspect, the present application provides a task scheduling device based on an improved chimpanzee optimization algorithm, including:

an initialization module, configured for obtaining a task to be scheduled and a task scheduling model pre-established by using the chimpanzee optimization algorithm, and initializing a population and a parameter by using a two-dimensional function Halton sequence;

a computation module, configured for performing iterative computation of chimpanzees in the task scheduling model by the chimpanzee optimization algorithm; and an output module, configured for ending the iterative computation in response to that an iteration termination condition is reached, outputting an optimal solution, and obtaining an optimal scheduling scheme.

In a third aspect, the present application provides a computer-readable storage medium, on which a computer program is stored, wherein the computer program, when executed by a processor, implements the task scheduling method based on the improved chimpanzee optimization algorithm as mentioned above in any one of the first aspect.

In a fourth aspect, the present application provides an apparatus, including:

a memory for storing instructions;

a processor for executing the instructions, where the device performs operations implementing the task scheduling method based on the improved chimpanzee optimization algorithm as mentioned above in any one of the first aspect.

Beneficial Effects Achieved by the Present Application Compared to the Prior Art:

The present application discloses a task scheduling method based on an improved chimpanzee optimization algorithm, including: obtaining a task to be scheduled and a task scheduling model pre-established by using a chimpanzee optimization algorithm, and initializing a population and a parameter by using a two-dimensional function Halton sequence; performing iterative computation of chimpanzees in the task scheduling model by the chimpanzee optimization algorithm; and ending the iterative computation in response to that an iteration termination condition is reached, outputting an optimal solution, and obtaining an optimal scheduling scheme. The two-dimensional Halton sequence is used to initialize the chimpanzee population, so that the individuals of the population are more uniformly distributed in the entire solution space, the population diversity at the time of initialization of the algorithm is improved, and the individuals can quickly discover the position of the high-quality solution, to speed up the convergence of the algorithm and improve the accuracy of the algorithm. The improved chimpanzee optimization algorithm has different aspects of performance enhancement compared to general intelligence algorithms of population, and also has significant effectiveness in the application of task scheduling in the actual cloud computing environment, so that the global exploration and local exploitation phases of the algorithm reach a dynamic balance, thus effectively alleviating the traditional chimpanzee optimization algorithm into a local optimal solution.

BRIEF DESCRIPTION OF THE DRAWINGS

FIG. 1 is a first flowchart of a task scheduling method based on an improved chimpanzee optimization algorithm according to a first embodiment of the present application.

DETAILED DESCRIPTION OF THE EMBODIMENTS

Figure 2:
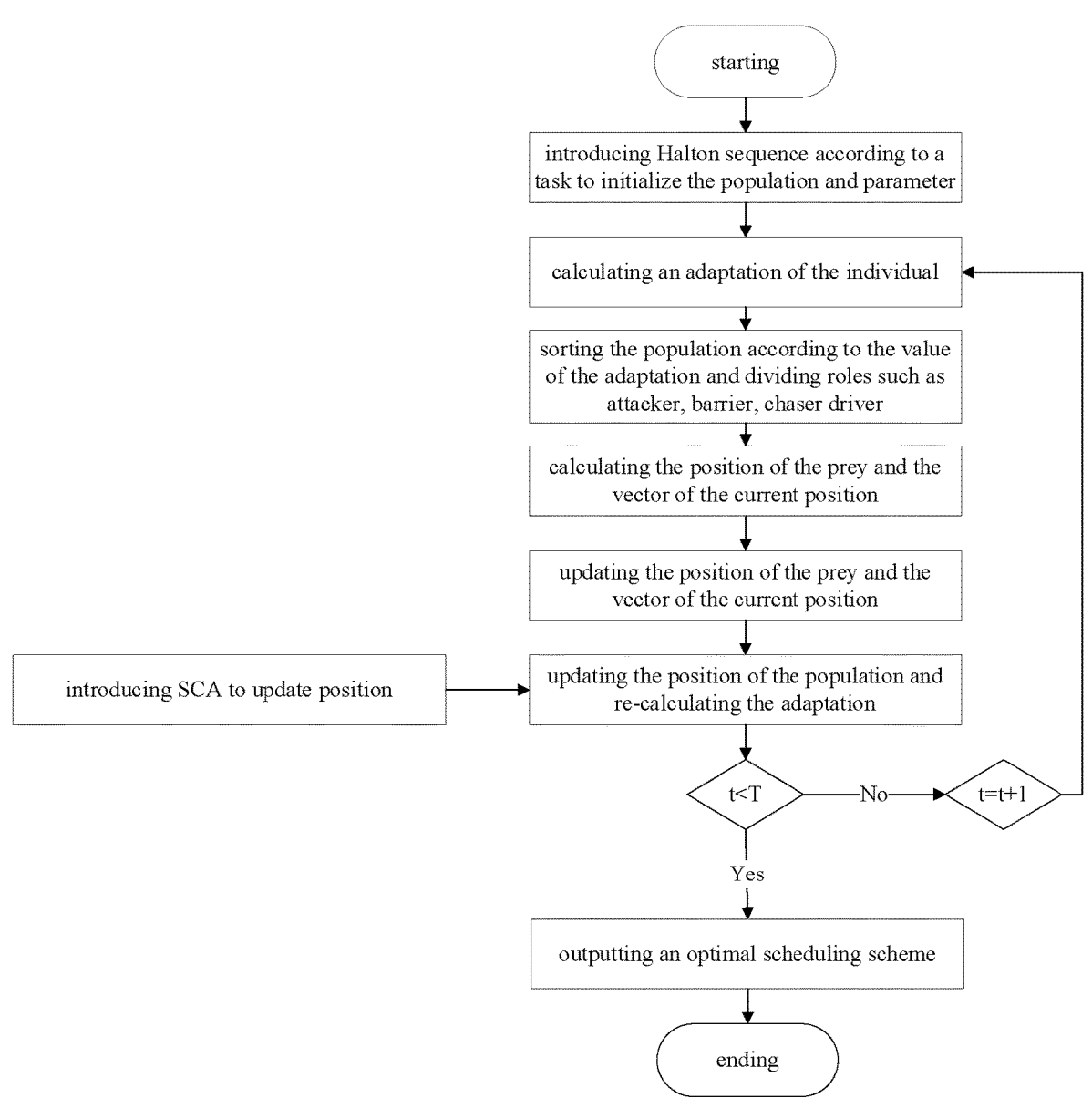
FIG. 2 is a second flowchart of a task scheduling method based on an improved chimpanzee optimization algorithm according to a second embodiment of the present application.
Figure 3:
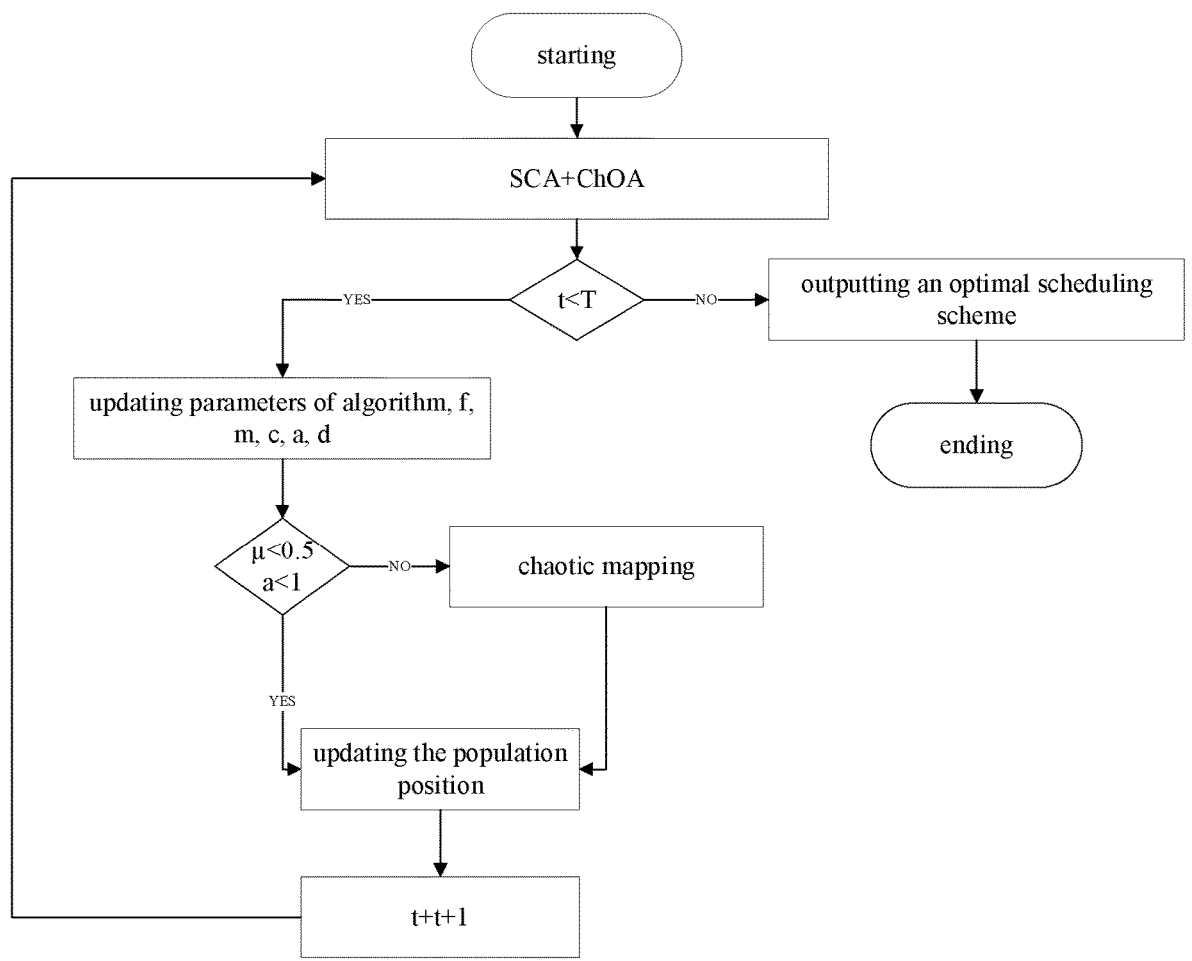
FIG. 3 is a flowchart of a method of real-time updating of optimized algorithm parameters in a task scheduling method based on an improved chimpanzee optimization algorithm according to the first embodiment of the present application.

The following is a detailed description of the technical solution of the present application by the accompanying drawings and specific embodiments, and it should be understood that the embodiments of the present application and the specific features in the embodiments are detailed descriptions of the technical solution of the present application, rather than limitations on the technical solution of the present application, and that the embodiments of the present application and the technical features in the embodiments can be combined with each other in the event of no conflict.

The term "and/or" herein is merely a description of an association relationship of an associated object, indicating that three kinds of relationships may exist, for example, A and/or B, which may indicate: A alone, both A and B, and B alone. In addition, the character "/" herein generally indicates that the associated objects before and after are in an "or" relationship.

The First Embodiment

As shown FIG. 1, the present application provides a task scheduling method based on an improved chimpanzee optimization algorithm, including:

Step 1, establishing a task scheduling model by using a chimpanzee optimization algorithm according to task to be scheduled, the establishing the task scheduling model by using the chimpanzee optimization algorithm includes:

taking a plurality of virtual machines in a cloud computing as a plurality of chimpanzees in the population, taking task assignment to the virtual machines as a process of the plurality of chimpanzees driving and chasing preys, and the process of the plurality of chimpanzees driving and chasing the preys being a process of finding the optimal solution Step 2, generating pseudo-random numbers by using a two-dimensional function Halton sequence to initialize a population and a parameter, the population and the parameter include a number N of individuals in the population, a maximum number T of iterations, a dimension d, and coefficient vectors a, h, and c, etc.

The two-dimensional function Halton sequence includes:

$$n = \sum\nolimits_{i=0}^{m} b_i \cdot p^i = b_m \cdot p^m + \cdots + b_1 \cdot p^1 + b_0;$$

$$\theta(n) = b_0 \cdot p^{-1} + b_1 \cdot p^{-2} + \cdots + b_m \cdot p^{-m-1};$$

$$H(n) = [\theta_1(n), \theta_2(n)];$$

where n is any integer within [1, N], N is a number of individuals in the population, p is a prime number not less than 2, $b_i \in \{0, 1, 2 \ldots, p-1\}$ is a constant, $\theta(n)$ is a defined sequence function, H(n) is a final obtained two-dimensional Halton sequence, m is a number of nodes, n is a total number of tasks, i is greater than and equal to 1 and less than and equal to N, and i is a number of cycles;

where a position of a Nth chimpanzee is $X_{ij}$, $i \in \{1, 2, \ldots, m\}$, $j \in \{1, 2, \ldots, n\}$, m is a number of nodes and n is a total number of tasks, i is greater than and equal to 1 and less than and equal to N.

The population coefficient vectors a, c, and h are calculated from the equation $a=2 \cdot f \cdot r_1 - f$; $c=2 \cdot r_2$; $h=chaotic\_value$; where f is an adaptive convergence factor that decreases nonlinearly from 2.5 to 0 during the exploration and exploitation phases; and h is a chaotic mapping vector representing the effect of sexual motivation of chimpanzee population during the hunting process.

The original chimpanzee algorithm uses six deterministic chaotic process mappings with stochastic behavior, and to simulate this social behavior, the mathematical model is shown below assuming that there is a 50% probability of performing both the normal mechanism of updating locations and using a chaotic model for process mapping:

$$X_{chimp}(t+1) \begin{cases} X_{prey}(t) - a \cdot d \cdot f, \ \mu < 0.5 \\ chaotic\_value \cdot f, \ \mu \geq 0.5 \end{cases};$$

where $X_{chimp}$ (t+1) is a vector of a position where the chimpanzee is located at the next number of iterations, $X_{prey}$ (t) is a vector of a position of the prey at the current number of iterations, and p is a random number within [0, 1].

Step 3, calculating an adaptation of each chimpanzee in the population, sorting the population according to the value of the calculated adaptation from high to low and dividing the role of the population including an attacker, a barrier, a chaser and a driver; the attacker is a current optimal solution, and the other three are descending in order;

obtaining a mathematical model of the process of the plurality of chimpanzees driving and chasing the preys according to the role of the population, the mathematical model being:

$$d(t) = |c \cdot X_{prey}(t) - h \cdot X_{chimp}(t)|;$$

$$X_{chimp}(t+1) = X_{prey}(t) - a \cdot d;$$

wherein t is a current number of iterations, d is a distance of each chimpanzee from the prey, a and c are coefficient vectors, h is a chaotic mapping vector, h represents an effect of sexual motivation of the chimpanzee population during a hunting process, $X_{prey}$ is a vector of a position of the prey, $X_{chimp}$ is a vector of a position where the chimpanzee is currently located, d(t) is a vector of a distance of each chimpanzee from the prey under the current number of iterations, and $X_{chimp}$ (t+1) is a vector of a position where the chimpanzee is located under the next number of iterations.

The obtaining the initial population role position includes:

selecting four candidate solutions with a highest degree of adaptation according to the role of the population and the mathematical model of the process of the chimpanzee driving and chasing the preys, and obtaining the vector of positions of the other chimpanzees and a vector of the initial population role position by a position vector computation formula.

Step 4, after selecting four candidate solutions with a highest degree of adaptation, updating the vector of positions of the other chimpanzees and the vector of positions of the above four roles.

The vector of positions of the above four roles is the initial population role position vector, the position vector computation formula:

$$d_{Attacker} = |c_1 \cdot X_{Attacker} - h_1 \cdot X|;$$

$$d_{Barrier} = |c_2 \cdot X_{Barrier} - h_2 \cdot X|;$$

$$d_{Chaser} = |c_3 \cdot X_{Chaser} - h_3 \cdot X|;$$

$$d_{Driver} = |c_4 \cdot X_{Driver} - h_4 \cdot X|;$$

$$X_1 = X_{Attacker} - a_1 \cdot d_{Attacker};$$

$$X_2 = X_{Barrier} - a_2 \cdot d_{Barrier};$$

$$X_3 = X_{Chaser} - a_3 \cdot d_{Chaser};$$

$$X_4 = X_{Driver} - a_4 \cdot d_{Driver};$$

$$X(t+1) = \frac{X_1 + X_2 + X_3 + X_4}{4};$$

where $d_{Attacker}$ is a distance between the attacker chimpanzee and the prey, $d_{Barrier}$ is a distance between the barrier chimpanzee and the prey, $d_{Chaser}$ is a distance between the chaser chimpanzee and the prey, $d_{Driver}$ is a distance between the driver chimpanzee and the prey, $X_{Attacker}$ is a vector of position of the attacker chimpanzee, $X_{Barrier}$ is a vector of position of the barrier chimpanzee, $X_{Chaser}$ is a vector of position of the chaser chimpanzee, $X_{Driver}$ is a vector of position of the driver chimpanzee; $c_1 c_2 c_3 c_4$, $a_1 a_2 a_3 a_4$ are all coefficient vectors, $h_1$, $h_2$, $h_3$, $h_4$ represent the effects of sexual motivation of the chimpanzee population during the hunting process, $X_1$, $X_2$, $X_3$, $X_4$ are the vectors of the positions during calculation, X(t+1) is a vector of position at next moment, and X is a vector of position at current moment.

Step 5, introducing a sine-cosine optimization strategy (SCA) to correct a position update strategy of an original chimpanzee optimization algorithm, calculating a position where the optimal solution locates while balancing the algorithm, and the corrected position update strategy is:

$$X(t+1) = \begin{cases} X(t) + r_3 \times \sin(2\pi r_4) \times D^{\theta}, \ r_5 < 0.5 \\ X(t) + r_3 \times \cos(2\pi r_4) \times D^{\theta}, \ r_5 \geq 0.5 \end{cases};$$

$$D^{\theta} = |r_6 X_i^{\alpha}(t) - |X_i(t)||;$$

$$r_3 = 2 - 2 \times \frac{t}{T};$$

where $r_3$ is a number that is adaptively reduced with the number of iterations, $r_4$, $r_5$ and $r_6$ are random numbers within [0,1], and X(t) is an updated vector of position of the chimpanzee, $D^{\theta}$ is a sine-cosine optimization strategy formula.

Step 6, updating the position of the population and the positions of the four leaders attacker, barrier, chaser, and driver, and recalculating the adaptation;

It should be noted that the adaptation function should be designed according to the specific application of the algorithm, and the calculation method of the adaptation function is different in different application scenarios.

Step 7, determining whether the iteration termination condition is reached, if the termination condition is reached, ending the calculation and executing the step 8, otherwise executing cyclically step 2 to step 6;

when t is less than and equal to T, the iteration termination condition is reached, then executing step 8 and ending the iterative computation, outputting the optimal solution and obtaining the optimal scheduling scheme;

when t is greater than and equal to T, the iterative termination condition is not reached, then executing cyclically step 2 to step 6, reusing the two-dimensional function Halton sequence to initialize the population and the parameter, and continuing to executing the subsequent steps until the iterative termination condition is reached when the iterative calculation is ended.

Step 8, outputting the optimal solution, and obtaining the optimal scheduling scheme.

The Second Embodiment

Based on the same inventive concept as the first embodiment, this embodiment introduces a task scheduling device based on an improved chimpanzee optimization algorithm, including:

an initialization module, configured for obtaining a task to be scheduled and a task scheduling model pre-established by using the chimpanzee optimization algorithm, and initializing a population and a parameter by using a two-dimensional function Halton sequence;

a computation module, configured for performing iterative computation of chimpanzees in the task scheduling model by the chimpanzee optimization algorithm; and an output module, configured for ending the iterative computation in response to that an iteration termination condition is reached, outputting an optimal solution, and obtaining an optimal scheduling scheme.

The specific functional realization of each of the above modules is referred to the relevant contents in the method of the second embodiment and will not be repeated.

The Third Embodiment

Based on the same inventive concept as the other embodiments, this embodiment introduces a computer-readable storage medium on which a computer program is stored, the computer program, when executed by a processor, implements the task scheduling method based on the improved chimpanzee optimization algorithm as described in any one of the first embodiments.

The Fourth Embodiment

Based on the same inventive concept as the other embodiments, this embodiment introduces an apparatus including:

a memory for storing instructions;

a processor for executing the instructions, wherein the device performs operations implementing the task scheduling method based on the improved chimpanzee optimization algorithm as described in any one of the first embodiments.

In summary of the above embodiments, the present application discloses a task scheduling method based on the improved chimpanzee optimization algorithm, which introduces a two-dimensional function Halton sequence to generate pseudo-random numbers to initialize the population on the basis of the random initialization of the chimpanzee algorithm, to make the individuals of the population more uniformly distributed throughout the entire solution space, to increase the diversity of the population at the time of initialization of the algorithm, and the individuals are able to quickly discover the position of the high-quality solution, thereby speeding up the convergence of the algorithm and improve the accuracy of the algorithm, a sine-cosine optimization strategy is introduced during the execution of the algorithm for position updating, such that the global exploration and local exploitation phases of the algorithm reach a dynamic balance, thus effectively alleviating the traditional chimpanzee optimization algorithm from falling into the local optimal solution, and improving the reasonableness of the task scheduling and the utilization rate of resources. The improved chimpanzee optimization algorithm has different aspects of performance improvement compared to general swarm intelligence algorithms such as particle swarm optimization algorithm (PSO), grey wolf optimization algorithm (GWO), and traditional chimpanzee optimization algorithm (ChOA), and also has significant effectiveness in task scheduling applications in the actual cloud computing environment.

The foregoing is only an embodiment of the present application, and it should be noted that for those skilled in the art, without departing from the technical principles of the present application, a number of improvements and deformations can be made, which should also be considered as the scope of the present application.

The invention claimed is:

1. A task scheduling method based on an improved chimpanzee optimization algorithm, comprising:

obtaining a task to be scheduled and a task scheduling model pre-established by using a chimpanzee optimization algorithm, and initializing a population and a parameter by using a two-dimensional function Halton sequence;

performing iterative computation of chimpanzees in the task scheduling model by the chimpanzee optimization algorithm; and ending the iterative computation in response to determining that an iteration termination condition is reached, outputting an optimal solution, and obtaining an optimal scheduling scheme.

2. The task scheduling method based on the improved chimpanzee optimization algorithm according to claim 1, wherein the performing iterative computation of chimpanzees in the task scheduling model by the chimpanzee optimization algorithm comprises:

obtaining an initial population position and an initial adaptation of each chimpanzee in the population, sorting the population according to a value of the adaptation and dividing a role of the population, and obtaining an initial population role position;

updating the population position and the population role position according to a sine- cosine optimization strategy to obtain an updated adaptation of each chimpanzee in the population; and wherein the task scheduling model pre-established by using the chimpanzee optimization algorithm comprises:

taking a plurality of virtual machines in a cloud computing as a plurality of chimpanzees in the population, taking task assignment to the virtual machines as a process of the plurality of chimpanzees driving and chasing preys, and the process of the plurality of chimpanzees driving and chasing the preys being a process of finding the optimal solution.

3. The task scheduling method based on the improved chimpanzee optimization algorithm according to claim 2, wherein the two-dimensional function Halton sequence comprises:

$$n = \sum_{i=0}^{m} b_i \cdot p^i = b_m \cdot p^m + \cdots + b_1 \cdot p^1 + b_0;$$

$$\theta(n) = b_0 \cdot p^{-1} + b_1 \cdot p^{-2} + \cdots + b_m \cdot p^{-m-1};$$

$$H(n) = [\theta_1(n), \theta_2(n)];$$

wherein n is any integer within [1, N], N is a number of individuals in the population, p is a prime number not less than 2, $b_i \in \{0, 1, 2 \ldots, p-1\}$ is a constant, $\theta(n)$ is a defined sequence function, H(n) is a final obtained two-dimensional Halton sequence, m is a number of nodes, n is a total number of tasks, i is greater than and equal to 1 and less than and equal to N, and i is a number of cycles;

wherein a position of a Nth chimpanzee is $X_{ij}$, $i \in \{1, 2, \ldots, m\}$, $j \in \{1, 2, \ldots, n\}$.

4. The task scheduling method based on the improved chimpanzee optimization algorithm according to claim 3, wherein the sorting the population according to the value of the adaptation and dividing the role of the population, and obtaining the initial population role position comprises:

sorting the population according to the value of the adaptation from high to low and dividing the role of the population, wherein the role of the population comprises an attacker, a barrier, a chaser and a driver; the attacker is a current optimal solution, and the other three are descending in order;

obtaining a mathematical model of the process of the plurality of chimpanzees driving and chasing the preys according to the role of the population, the mathematical model being:

$$d(t) = |c \cdot X_{prey}(t) - h \cdot X_{chimp}(t)|;$$

$$X_{chimp}(t + 1) = X_{prey}(t) - a \cdot d;$$

wherein t is a current number of iterations, d is a distance of each chimpanzee from the prey, a and c are coefficient vectors, h is a chaotic mapping vector, h represents an effect of sexual motivation of the chimpanzee population during a hunting process, $X_{prey}$ is a vector of a position of the prey, $X_{chimp}$ is a vector of a position where the chimpanzee is currently located, d(t) is a vector of a distance of each chimpanzee from the prey under the current number of iterations, and $X_{chimp}$ (t+1) is a vector of a position where the chimpanzee is located under a next number of iterations.

5. The task scheduling method based on the improved chimpanzee optimization algorithm according to claim 4, wherein the obtaining the initial population role position comprises:

selecting four candidate solutions with a highest degree of adaptation according to the role of the population and the mathematical model of the process of the chimpanzee driving and chasing the preys, and obtaining the vector of positions of the other chimpanzees and a vector of the initial population role position by a position vector computation formula, the position vector computation formula comprising:

$$d_{Attacker} = |c_1 \cdot X_{Attacker} - h_1 \cdot X|;$$

$$d_{Barrier} = |c_2 \cdot X_{Barrier} - h_2 \cdot X|;$$

-continued $$d_{Chaser} = |c_3 \cdot X_{Chaser} - h_3 \cdot X|;$$

$$d_{Driver} = |c_4 \cdot X_{Driver} - h_4 \cdot X|;$$

$$X_1 = X_{Attacker} - a_1 \cdot d_{Attacker};$$

$$X_2 = X_{Barrier} - a_2 \cdot d_{Barrier};$$

$$X_3 = X_{Chaser} - a_3 \cdot d_{Chaser};$$

$$X_4 = X_{Driver} - a_4 \cdot d_{Driver};$$

$$X(t + 1) = \frac{X_1 + X_2 + X_3 + X_4}{4};$$

wherein $d_{Attacker}$ is a distance between the attacker chimpanzee and the prey, $d_{Barrier}$ is a distance between the barrier chimpanzee and the prey, $d_{Chaser}$ is a distance between the chaser chimpanzee and the prey, $d_{Driver}$ is a distance between the driver chimpanzee and the prey, $X_{Attacker}$ is a vector of position of the attacker chimpanzee, $X_{Barrier}$ is a vector of position of the barrier chimpanzee, $X_{Chaser}$ is a vector of position of the chaser chimpanzee, $X_{Driver}$ is a vector of position of the driver chimpanzee; $c_1 c_2 c_3 c_4$, $a_1 a_2 a_3 a_4$ are all coefficient vectors, $h_1 h_2 h_3 h_4$ represent the effect of sexual motivation of the chimpanzee population during the hunting process, $X_1$, $X_2$, $X_3$, $X_4$ are the vectors of the positions during calculation, X(t+1) is a vector of position at next moment, and X is a vector of position at current moment.

6. The task scheduling method based on the improved chimpanzee optimization algorithm according to claim 5, wherein the updating the population position and the population role position according to the sine-cosine optimization strategy comprises:

correcting a position update strategy of an original chimpanzee optimization algorithm according to the sine-cosine optimization strategy, calculating a position where the optimal solution locates while balancing the algorithm, and the corrected position update strategy is:

$$X(t + 1) = \begin{cases} X(t) + r_3 \times \sin(2\pi r_4) \times D^\theta, & r_5 < 0.5 \\ X(t) + r_3 \times \cos(2\pi r_4) \times D^\theta, & r_5 \geq 0.5 \end{cases};$$

$$D^\theta = |r_6 X_i^\alpha(t) - |X_i(t)||;$$

$$r_3 = 2 - 2 \times \frac{t}{T};$$

where $r_3$ is a number that is adaptively reduced with the number of iterations, $r_4$, $r_5$ and $r_6$ are random numbers within [0,1], and X(t) is an updated vector of position of the chimpanzee, $D^\theta$ is a sine-cosine optimization strategy formula.

7. The task scheduling method based on the improved chimpanzee optimization algorithm according to claim 1, wherein the ending the iterative computation in response to determining that the iteration termination condition is reached, outputting the optimal solution, and obtaining the optimal scheduling scheme, further comprising:

in response to determining that t is less than T, the iteration termination condition is reached, ending the iterative computation, outputting the optimal solution, and obtaining the optimal scheduling scheme;

in response to determining that t is greater than and equal to T, the iteration termination condition is not reached, then reusing the two-dimensional function Halton sequence to initialize the population and the parameter, and continuing to executing subsequent steps until the iterative computation is ended in response to determining that the iteration termination condition is reached.

8. A non-transitory computer-readable storage medium, on which a computer program is stored, wherein the computer program, when executed by a processor, implements the task scheduling method based on the improved chimpanzee optimization algorithm as claimed in claim 1.

9. An apparatus, comprising:

a memory for storing instructions;

a processor for executing the instructions, wherein the device performs operations implementing the task scheduling method based on the improved chimpanzee optimization algorithm as claimed in claim 1.

\* \* \* \* \*